March 17, 1964 W. ASTHEIMER 3,125,691

PULSE STRETCHER EMPLOYING ALTERNATELY ACTUATED MONOSTABLE CIRCUITS FEEDING COMBINING CIRCUIT TO EFFECT STRETCHING

Filed March 9, 1961

INVENTOR.

BY WALTER ASTHEIMER

Carl V. Olson

ATTORNEY 3,125,691

PULSE STRETCHER EMPLOYING ALTERNATELY ACTUATED MONOSTABLE CIRCUITS FEEDING COMBINING CIRCUIT TO EFFECT STRETCHING

Walter Astheimer, Camden, N.J., assignor to Radio Corporation of America, a corporation of Delaware Filed Mar. 9, 1961, Ser. No. 94,514
6 Claims. (Cl. 307—88.5)

This invention relates to timing systems, and more particularly to a pulse stretcher system for translating non-uniformly spaced input signals to delayed output signal transitions. By way of example, the system of the invention is useful in connection with the decoding of sequential data, as in magnetic tape stations of electronic data processing apparatus, and in time multiplex communications and telemetering systems.

It is a general object of this invention to provide a timing system which is capable of translating non-uniformly spaced input signals to delayed output signal transitions, the system being operative even though input signals may be spaced in time less than the desired delay between the input and output signals.

According to an example of the invention, there is provided an input terminal which is coupled through a steering circuit to a bistable multivibrator having two output terminals which exhibit voltage transitions in opposite directions. Two monostable timing circuits are provided having inputs connected to the respective outputs of the bistable multivibrator. Each monostable timing circuit includes a resistor-capacitor time constant network. The outputs of the timing circuits are connected through an "or" circuit to a system output terminal. Successive input signals applied to the multivibrator cause triggering of alternate ones of the monostable timing circuits. By the alternate use of the two timing circuits, each timing circuit can recover while the other is active. The output signal from the "or" circuit of the system provides an output signal transition having a predetermined delay measured from the last received input signal, regardless of how closely the last received input signal followed the next previously received input signal.

Figure 1:
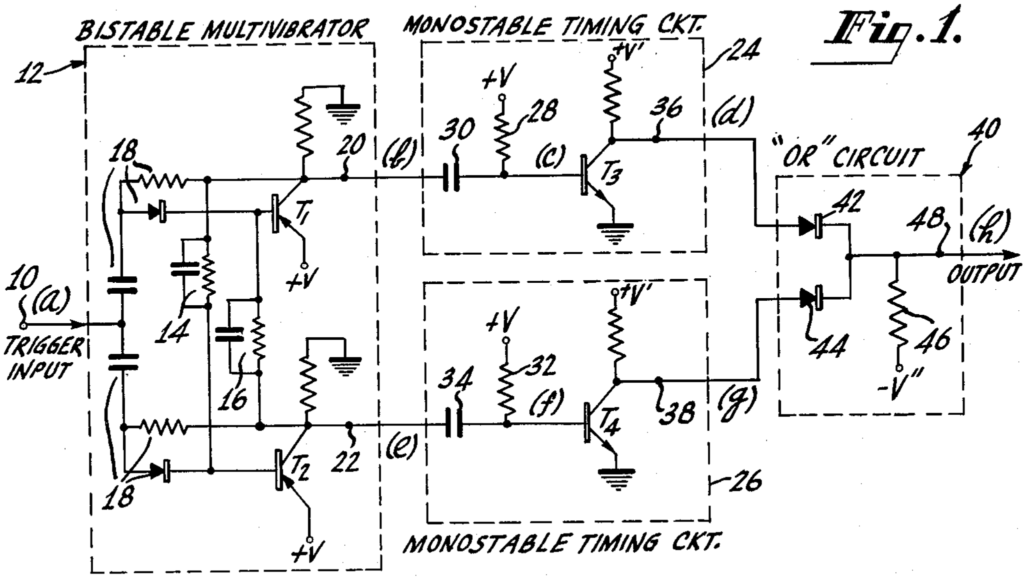
Figure 2:
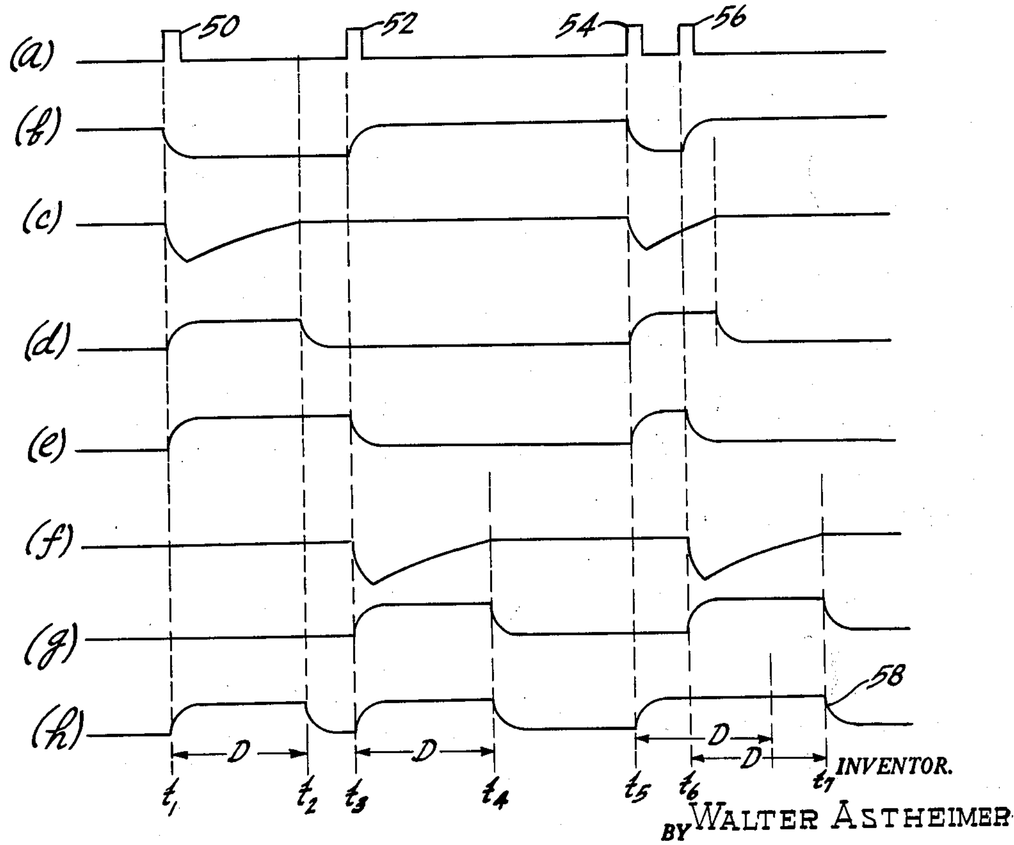

In the drawings, FIGURE 1 is a circuit diagram of a timing system constructed according to the teachings of the invention; and FIGURE 2 is a chart of voltage waveforms which will be referred to in describing the operation of the system of FIGURE 1.

The timing system of FIGURE 1 includes an input terminal 10 to which spaced input pulses may be applied. The input terminal 10 is connected to a conventional known bistable multivibrator 12 which includes two transistors $T_1$ and $T_2$. The transistors $T_1$ and $T_2$ have their base and collector electrodes cross coupled by means 14 and 16 (such as the resistor-capacitor combinations shown) so that when one transistor is conductive, the other is nonconductive, and vice versa. The trigger input is applied to the multivibrator 12 through a pulse steering circuit 18 constructed in the conventional manner to steer the input trigger pulses alternately to one and then the other of transistors $T_1$ and $T_2$. The steerable multivibrator 12 has two output terminals 20 and 22 which provide output voltage transitions in opposite directions, that is, when the voltage at output 20 rises, the voltage at output terminal 22 falls, and vice versa. The bistable multivibrator circuit 12 may be viewed as a switch means operative in response to input pulses to alternately energize the two following timing circuits 24 and 26.

The output terminal 20 of bistable multivibrator 12 is coupled to a first monostable timing circuit 24, and the output terminal 22 of the bistable multivibrator 12 is coupled to a second similar monostable timing circuit 26. The timing circuits 24 and 26 are known capacitor charging and discharging circuits. Timing circuit 24 includes a transistor $T_3$, and a resistor-capacitor time constant network 28, 30. The monostable timing circuit 26 similarly has a transistor $T_4$, and a resistor-capacitor time constant network 32, 34. The time constant of the resistor 28 and capacitor 30 in timing circuit 34 may be the same as the time constant of the resistor 32 and the capacitor 34 in timing circuit 26; or, if desired, they may have different time constants to provide alternately different delays.

Each of the monostable timing circuits 24 and 26 includes means to bias the transistor to be normally conductive or "on." A negative-going voltage transition applied through the capacitor 30 or 34 to the transistor $T_3$ or $T_4$ causes the transistor to be cut off for a period of time determined by the time constant of the resistor-capacitor network and the bias voltage +V.

The output terminals 36 and 38 of the monostable timing circuits 24 and 26 are coupled to the inputs of a combining circuit or "or" circuit 40. The "or" circuit 40 includes two diodes 42 and 44 arranged with relation to a bias resistor 46 and a −V voltage source so that whenever one or the other or both of the inputs are high, a relatively high output voltage is provided at the system output terminal 48.

The operation of the timing system of FIGURE 1 will now be described with reference to the voltage charts of FIGURE 2 which show voltage waveforms appearing at correspondingly designated points in the circuit of FIGURE 1. It is initially assumed that transistor $T_1$ is "on," the transistor $T_2$ is "off," and the timing transistors $T_3$ and $T_4$ are both "on." When a first input pulse 50 (curve *a* of FIGURE 2) is applied to the input terminal 10, the pulse is directed by the steering circuit 18 to the base electrode of the transistor $T_1$, causing the transistor $T_1$ to be turned "off" and the transistor $T_2$ to be turned "on." The changes in the collector voltages of transistors $T_1$ and $T_2$ at time $t_1$ is shown by the transition in the curves *b* and *e* of FIGURE 2. The negative-going transition coupled from the terminal 20 to the base of transistor $T_3$ causes transistor $T_3$ to be switched "off," and produces a negative-going transition at the base of transistor $T_3$, FIGURE 2*c*, which is immediately followed by an exponentially rising voltage. At time $t_2$, the voltage reaches the threshold value (slightly above emitterpotential) and causes transistor $T_3$ to switch back to the "on" or fully conducting condition. During the period of time between $t_1$ and $t_2$, the timing transistor $T_3$ is "off" or nonconducting and provides the output waveform *d* of FIGURE 2. The waveform *d* is coupled through the "or" circuit 40 to output terminal 48 to provide the output waveform *h* of FIGURE 2. It is seen that the output waveform includes a negative-going transition at the time $t_2$ which is delayed relative to the beginning at time $t_1$ of the input pulse 50 by an amount D.

The next following input pulse 52 (FIGURE 2*a*) is steered by the steering circuit 18 to the transistor $T_2$ causing it to switch from the "on" condition to the "off" condition with the result that a negative-going transition occurs at the collector output terminal 22 (FIGURE 2*e*) at time $t_3$. The negative transition is coupled to the base of the timing transistor $T_4$ (FIGURE 2*f*) causing the transistor $T_4$ to switch to the "off" or nonconducting conducting condition. The transistor $T_4$ remains "off" for a period of time determined by the resistance-capacitance network 32, 34. At time $t_4$, the transistor $T_4$ switches back to the "on" condition causing the negative-going voltage transition at time $t_4$ at the output terminal 38

(FIGURE 2$g$). The monostable timing circuit 26 thus provides a negative-going voltage transition at time $t_4$ which is delayed relative to the leading edge at time $t_3$ of the input pulse 52 by an amount D. The output of the monostable timing circuit 26 is coupled through the "or" circuit 40 to the output terminal 48 (FIGURE 2$h$). The delay D between times $t_3$ and $t_4$ provided by the timing circuit 26 may be the same as, or may be different from, the time delay D between times $t_1$ and $t_2$ provided by the timing circuit 24.

The operation of the system of FIGURE 1 will now be described for the condition when two closely spaced input pulses are applied. The next following input pulse 54 is steered to the transistor $T_1$ and causes transistor $T_3$ to be switched "off" and to start a timing cycle in the resistance-capacitance timing network 28, 30. This results in a positive-going transition, in the manner that has been described, in the output wave form FIGURE 2$h$ at the time $t_5$. Before the time delay period D has elapsed, a second input pulse 56 is applied to the input terminal 10. The input pulse 56 is steered to the transistor $T_2$ from whence the resulting transition is coupled to the monostable timing circuit 26 to provide an output at terminal 38 as shown between times $t_6$ and $t_7$ in FIGURE 2$g$. The output terminal 48 of circuit 40 (FIGURE 2$h$) thus includes between times $t_5$ and $t_7$ the contributions from both of the monostable timing circuits 24 and 26. The negative-going transition 58 in the output waveform FIGURE 2$h$ at time $t_7$ is delayed with reference to the leading edge at time $t_6$ of the last input pulse 56 by the desired amount D.

The action of the circuit of FIGURE 1, in responding to two input pulses 54 and 56 which are spaced more closely than the delay D provided by the timing circuit, achieves an important object of the invention. The negative transition 58 occurs at a preedtermined time D following the last received one 56 of the two input pulses 54 and 56. This desired result is achieved by the inclusion in the system of FIGURE 1 of the two monostable timing circuits which operate in an alternating fashion. One timing circuit is permitted to recover while the other is active, and vice versa. It is therefore clear that the timing system of FIGURE 1 provides the desired delay to randomly spaced or to non-uniformly spaced input pulses even though the input pulses are more closely spaced than the delay provided by the system.

The system output signal waveform of FIGURE 2$h$ may be utilized in any number of different ways. For example, the signal may be applied to a differentiating and clipping circuit providing an output pulse corresponding in time with solely the negative-going transitions of the waveform FIGURE 2$h$.

What is claimed is:

1. A timing system comprising an input terminal for receiving input pulses, two monostable timing circuits, switch means for alternately energizing said timing circuits respectively in response to alternate input pulses applied to said input terminal, and a combining circuit coupled to the outputs of said timing circuits.

2. A timing system comprising an input terminal for receiving input pulses, two monostable timing circuits, steerable multivibrator switch means for alternately energizing said timing circuits respectively in response to alternate input pulses applied to said input terminal, whereby each of said timing circuits can recover while the other is active, and an "or" circuit coupled to the outputs of said timing circuits.

3. A timing system comprising an input terminal for receiving input pulses, two monostable capacitor charging and discharging timing circuits, switch means connected between said input terminal and said timing circuits for alternately energizing said timing circuits respectively in response to alternate input pulses applied to said input terminal, said swtich means comprising a steerable multivibrator, and an "or" circuit coupled to the outputs of said timing circuits.

4. A timing system comprising an input terminal for receiving non-uniformly spaced input pulses, two capacitor charging and discharging timing circuits, switch means coupled between said input terminal and said timing circuits to trigger said timing circuits alternately in response to successive input pulses, said timing circuits each providing an output signal including a delayed transition, and an "or" circuit having inputs coupled to the outputs of the timing circuits, whereby, when two input pulses are more closely spaced than the delay provided by the timing circuit, the output from the "or" circuit includes a transition delayed with respect to the second of the two input pulses.

5. A timing system comprising an input terminal for receiving non-uniformly spaced input pulses, two capacitor charging and discharging timing circuits, a steerable multivibrator coupled between said input terminal and said timing circuits to trigger said timing circuits alternately in response to successive input pulses, said timing circuits each providing an output signal including a delayed transiiton, and an "or" circuit having inputs coupled to the outputs of the timing circuits, whereby the alternate employment of the two timing circuits permits each to recover while the other is active regardless of how closely spaced the input pulses may be 6. A timing system comprising: a bistable multivibrator having an input terminal, a steering circuit, and two output terminals, whereby each time an input pulse is applied to said input terminal the potentials at the output terminals of the multivibrator change in opposite directions, two monostable timing circuits connected respectively to the two output terminals of said multivibrator, each of said monostable timing circuits being triggered by a voltage change of one polarity from a normal state to another state and then back to the normal state after a predetermined time, and an "or" circuit connected to the outputs of said monostable circuits, whereby the output of said "or" circuit provides an output transition at said predetermined time following the last received input pulse even though the input pulses are spaced more closely than said predetermined time.

References Cited in the file of this patent

UNITED STATES PATENTS

| | | |
|---|---|---|
| 2,715,815 | Malick | Aug. 23, 1955 |
| 2,816,237 | Hageman | Dec. 10, 1957 |
| 3,034,063 | Hammond | May 8, 1962 |
| 3,043,964 | Seidman | July 10, 1962 |